(12) United States Patent
Kim et al.

(10) Patent No.: US 6,807,246 B1
(45) Date of Patent: Oct. 19, 2004

(54) LIPS-TYPE MULTI-PURPOSED NUCLEAR FUEL ASSEMBLY SPACER GRID

(75) Inventors: Dae Ho Kim, Daejeon (KR); Kee Nam Song, Daejeon (KR); Tae Hyun Chun, Daejeon (KR); Kyung Ho Yoon, Daejeon (KR); Dong Seok Oh, Daejeon (KR); Heung Seok Kang, Daejeon (KR); Youn Ho Jung, Daejeon (KR); Hyung Kyu Kim, Daejeon (KR); Wang Kee In, Daejeon (KR); Chang-Hwan Shin, Suwon-si (KR); Gyung Jin Park, Seoul (KR)

(73) Assignees: Korea Atomic Energy Research Institute, Daejeon (KR); Korea Hydro & Nuclear Power Co., Ltd., Seoul (KR)

( * ) Notice: Subject to any disclaimer, the term of this patent is extended or adjusted under 35 U.S.C. 154(b) by 0 days.

(21) Appl. No.: 10/328,974

(22) Filed: Dec. 24, 2002

(30) Foreign Application Priority Data

Dec. 26, 2001 (KR) .................................. 10-2001-0085115

(51) Int. Cl.[7] ................................................ G21C 3/34
(52) U.S. Cl. ........................ 376/438; 376/462; 376/439; 376/432
(58) Field of Search ................................ 376/438, 462, 376/439, 442

(56) References Cited

U.S. PATENT DOCUMENTS

| | | | |
|---|---|---|---|
| 3,801,088 A | * | 4/1974 | Piepers et al. .............. 267/164 |
| 4,692,302 A | | 9/1987 | DeMario et al. |
| 4,728,489 A | | 3/1988 | Hatfield |
| 5,299,245 A | | 3/1994 | Aldrich |
| 5,440,599 A | | 8/1995 | Rodack |
| 5,444,748 A | * | 8/1995 | Beuchel et al. ............. 376/438 |
| 6,236,702 B1 | * | 5/2001 | Chun et al. ................. 376/462 |
| 6,278,759 B1 | * | 8/2001 | Yoon et al. ................. 376/462 |

FOREIGN PATENT DOCUMENTS

FR    WO 99/03108    * 1/1999

* cited by examiner

Primary Examiner—Jack Keith
Assistant Examiner—R Palabrica
(74) Attorney, Agent, or Firm—Bachman & LaPointe, P.C.

(57) ABSTRACT

A lips-type multi-purposed spacer grid for supporting fuel rods within a nuclear fuel assembly is disclosed. In the spacer grid, the fuel rods are in contact with dimples and water strider-type springs in an equiangular surface contact manner. The spacer grid distributes load, applied to the springs, to the entire structure of its inner strips, thus reducing peak stress at the contact surfaces between the fuel rods and the springs and diminishing vibration of the fuel rods, and thereby reducing possible fretting wear of the fuel rods due to hydraulic vibration of the fuel rods. The spacer grid also enlarges the allowable elastic range of the springs, and allows the springs to soundly support the fuel rods by using residual spring force. The spacer grid has mixing blades capable of minimizing pressure loss and flow interference, so that the fuel rod cooling efficiency of the nuclear fuel assembly is improved.

9 Claims, 20 Drawing Sheets

--Fig. 1--
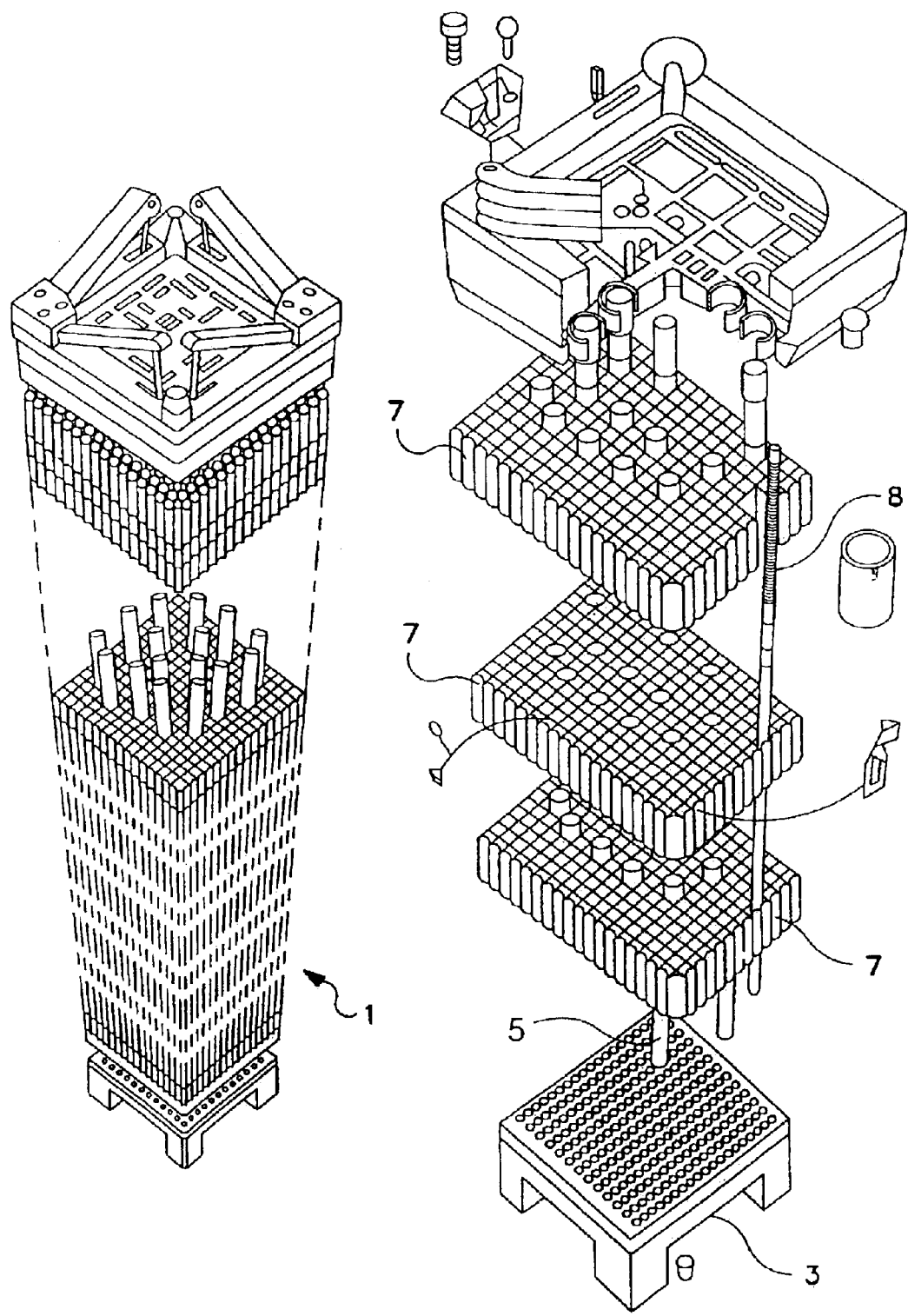
Contemporary Art

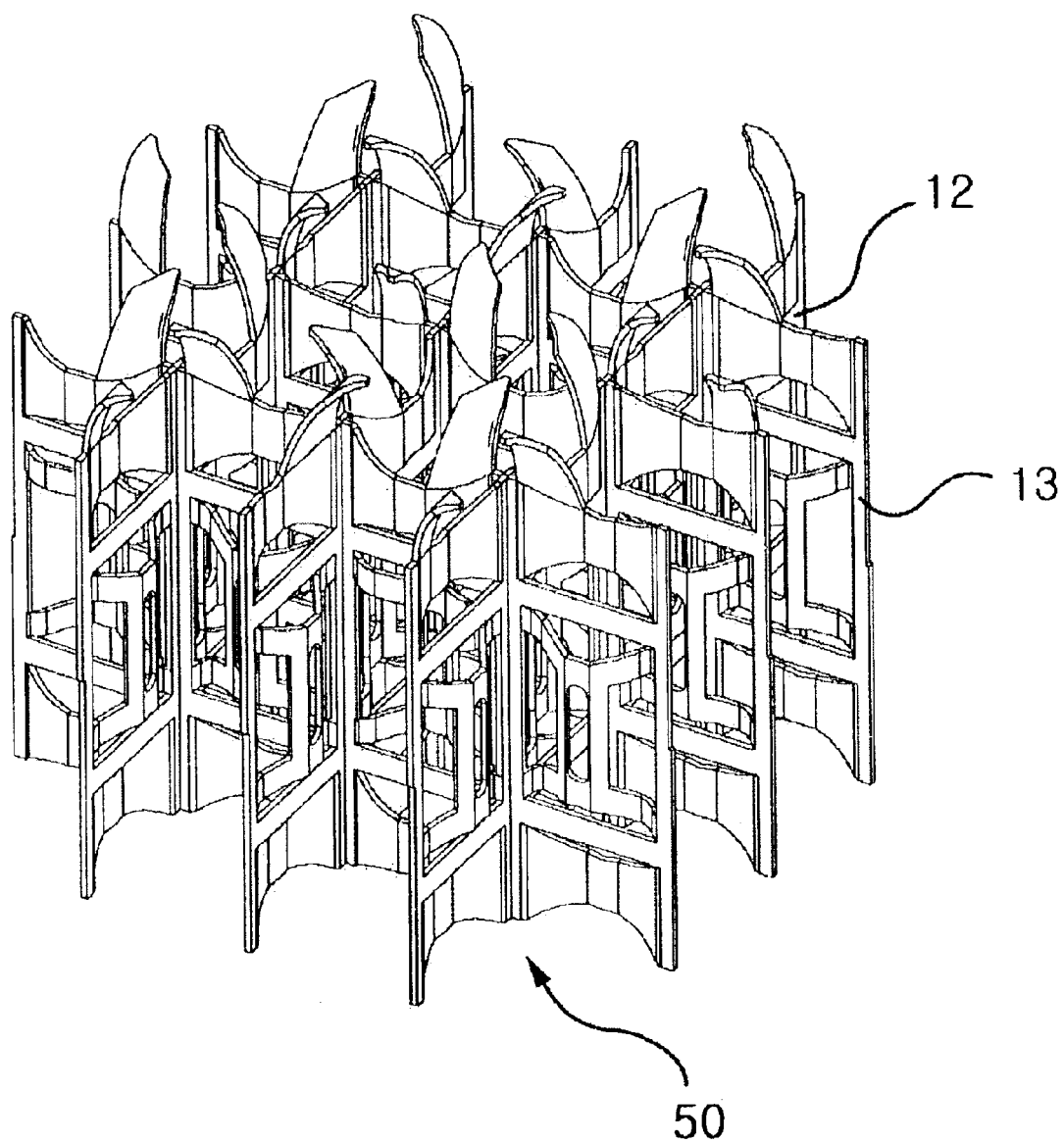
--Fig. 2--

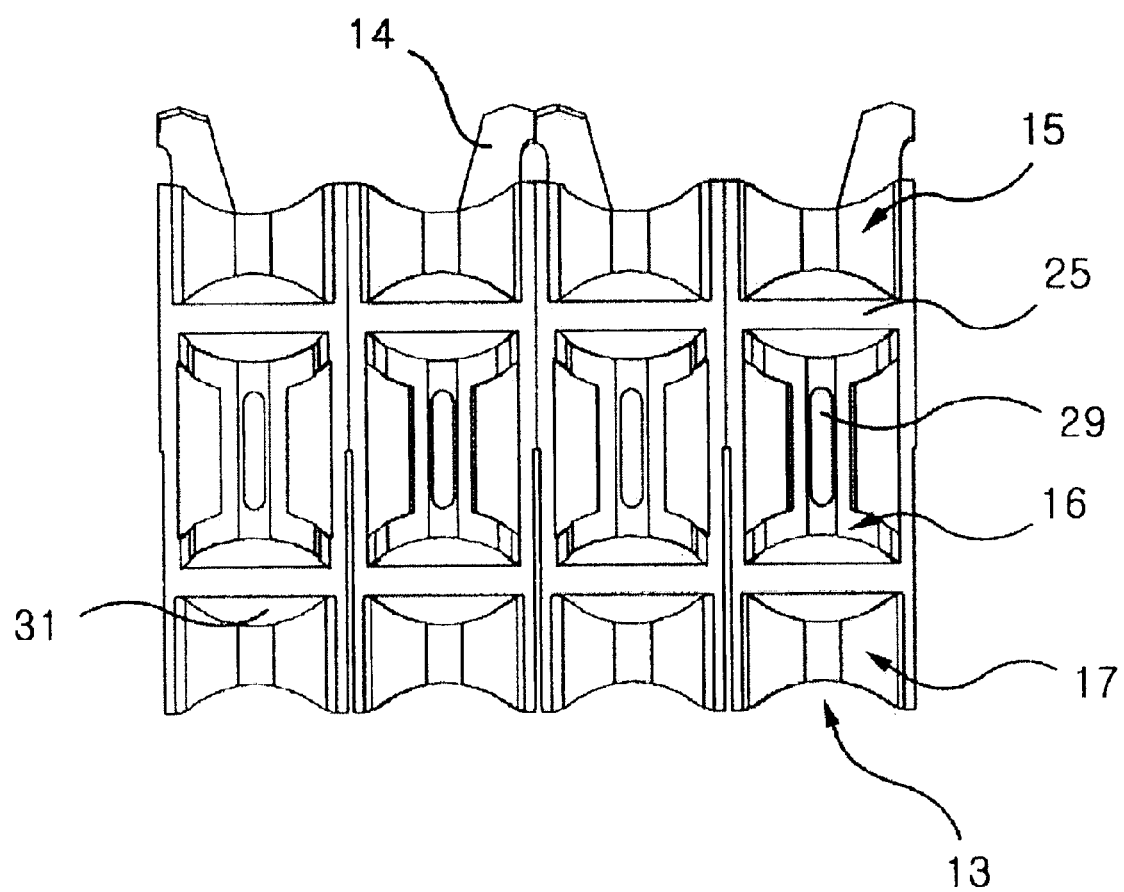
--Fig. 3a--

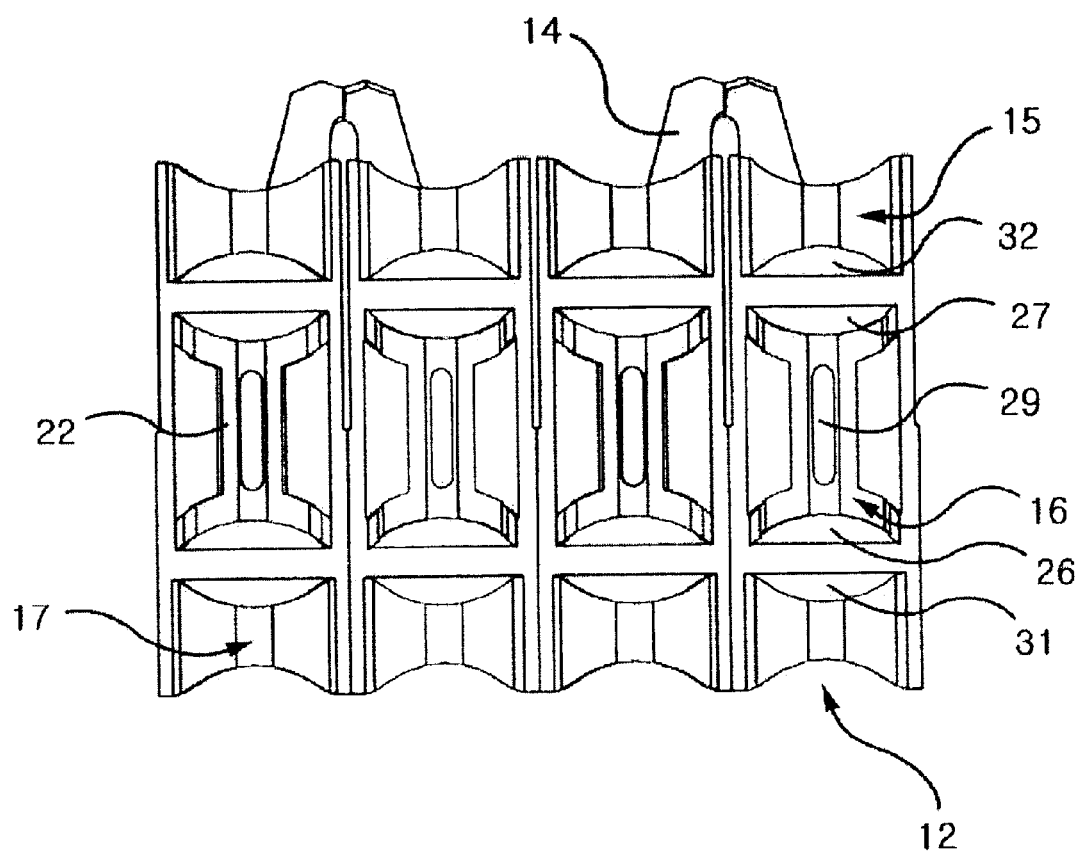
—Fig. 3b—

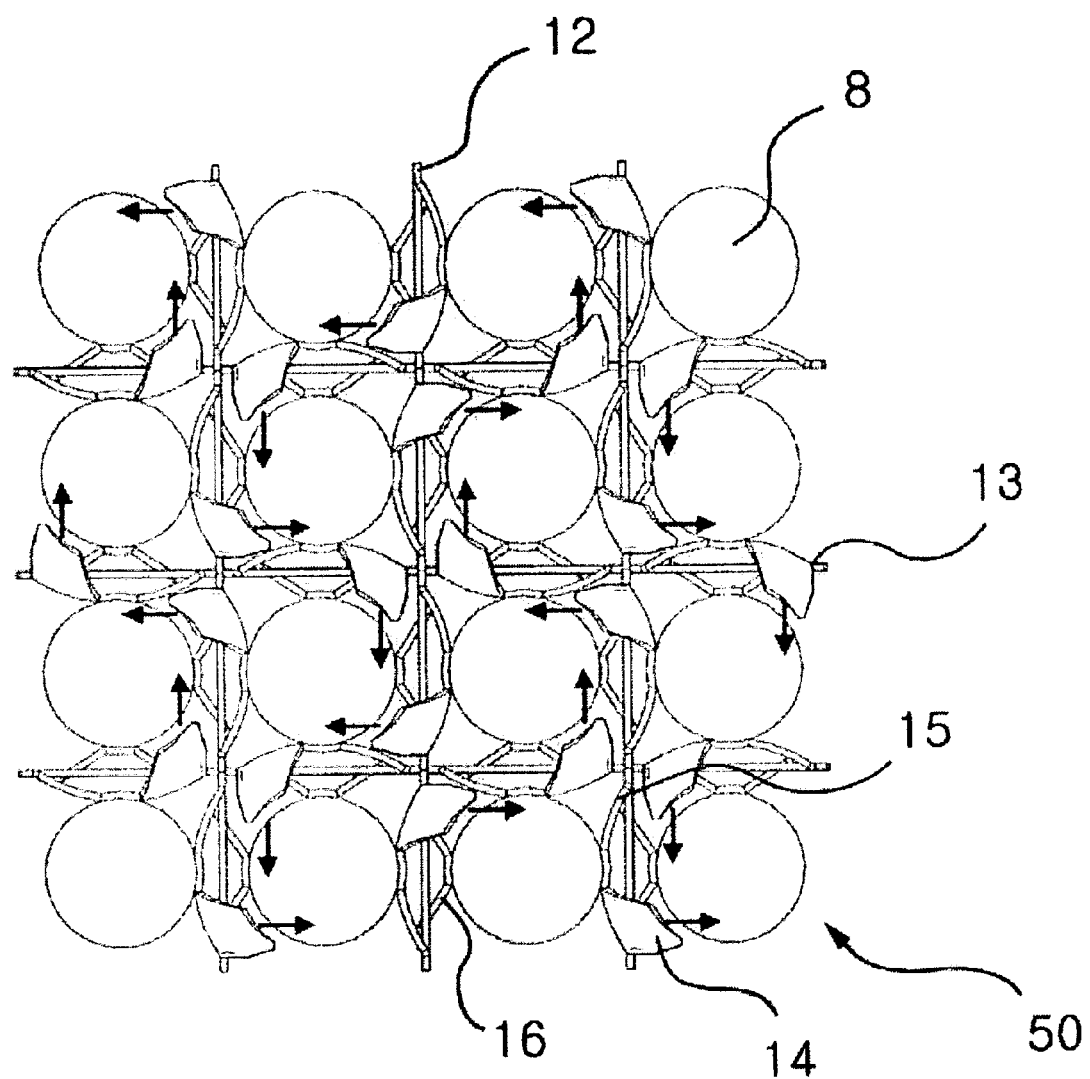
--Fig. 4a--

--Fig. 4b--
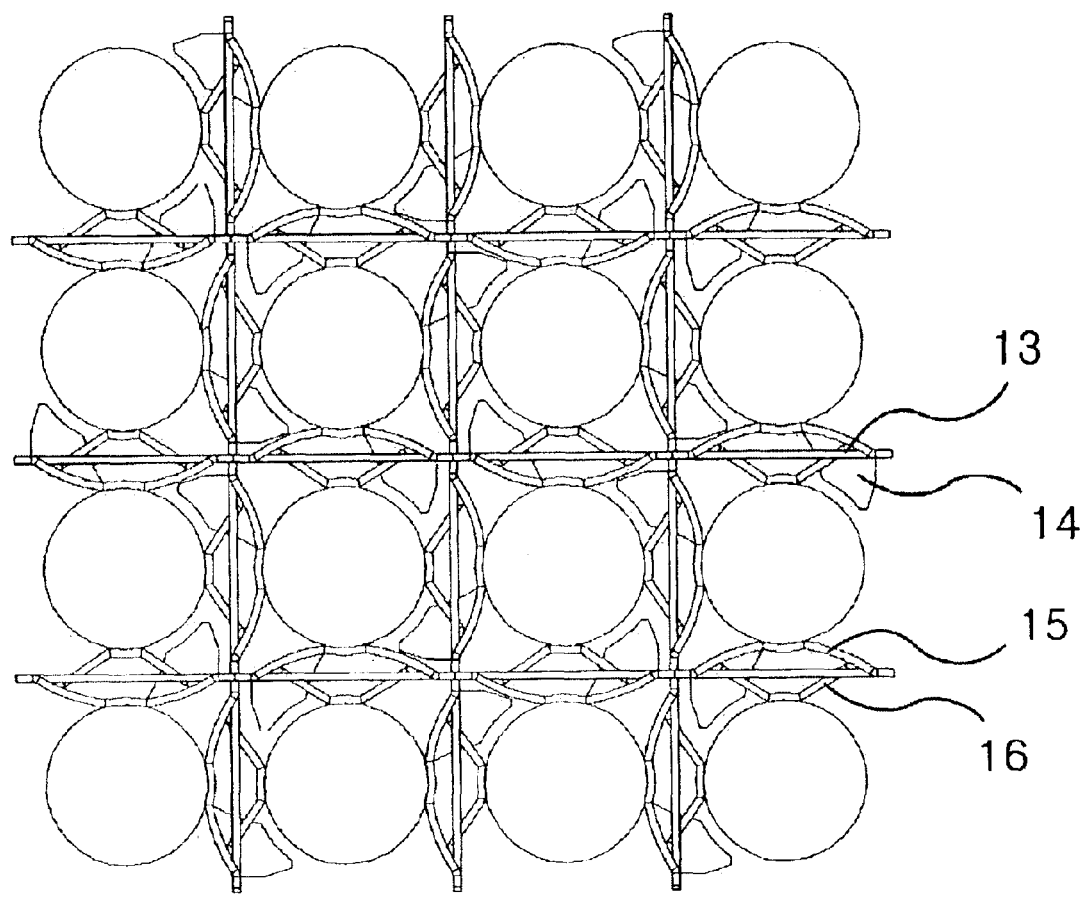

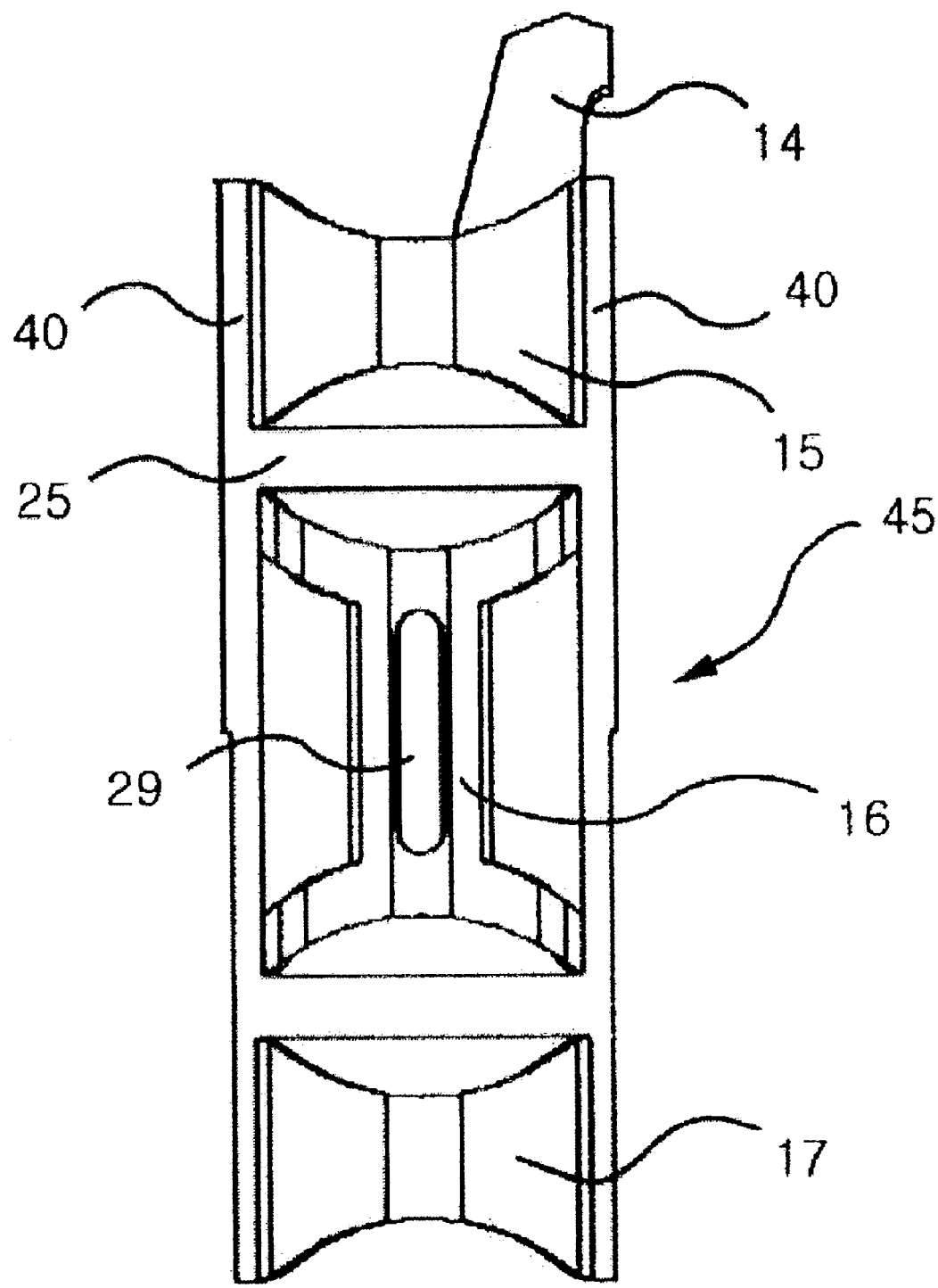
--Fig. 5--

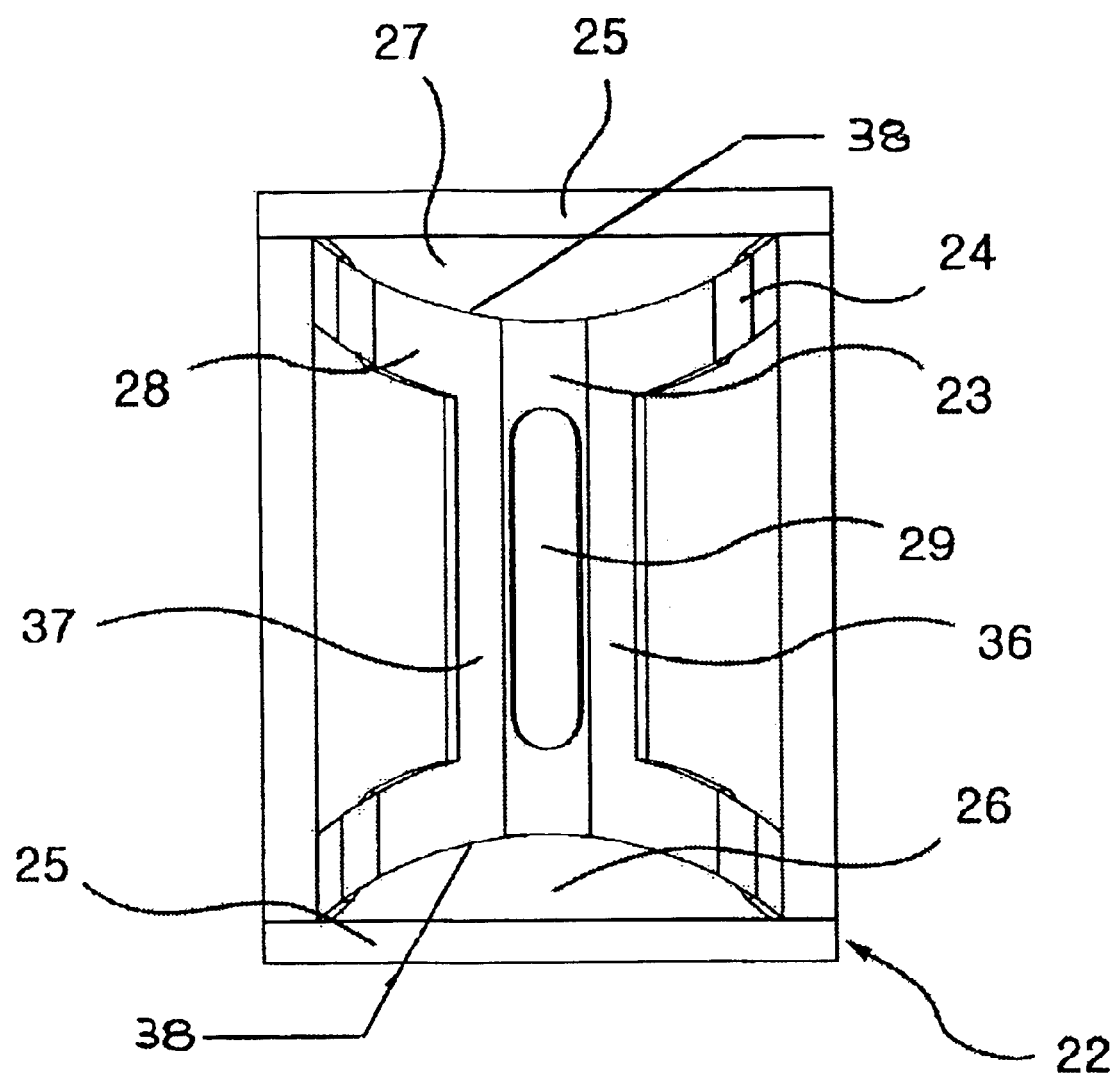
--Fig. 6a--

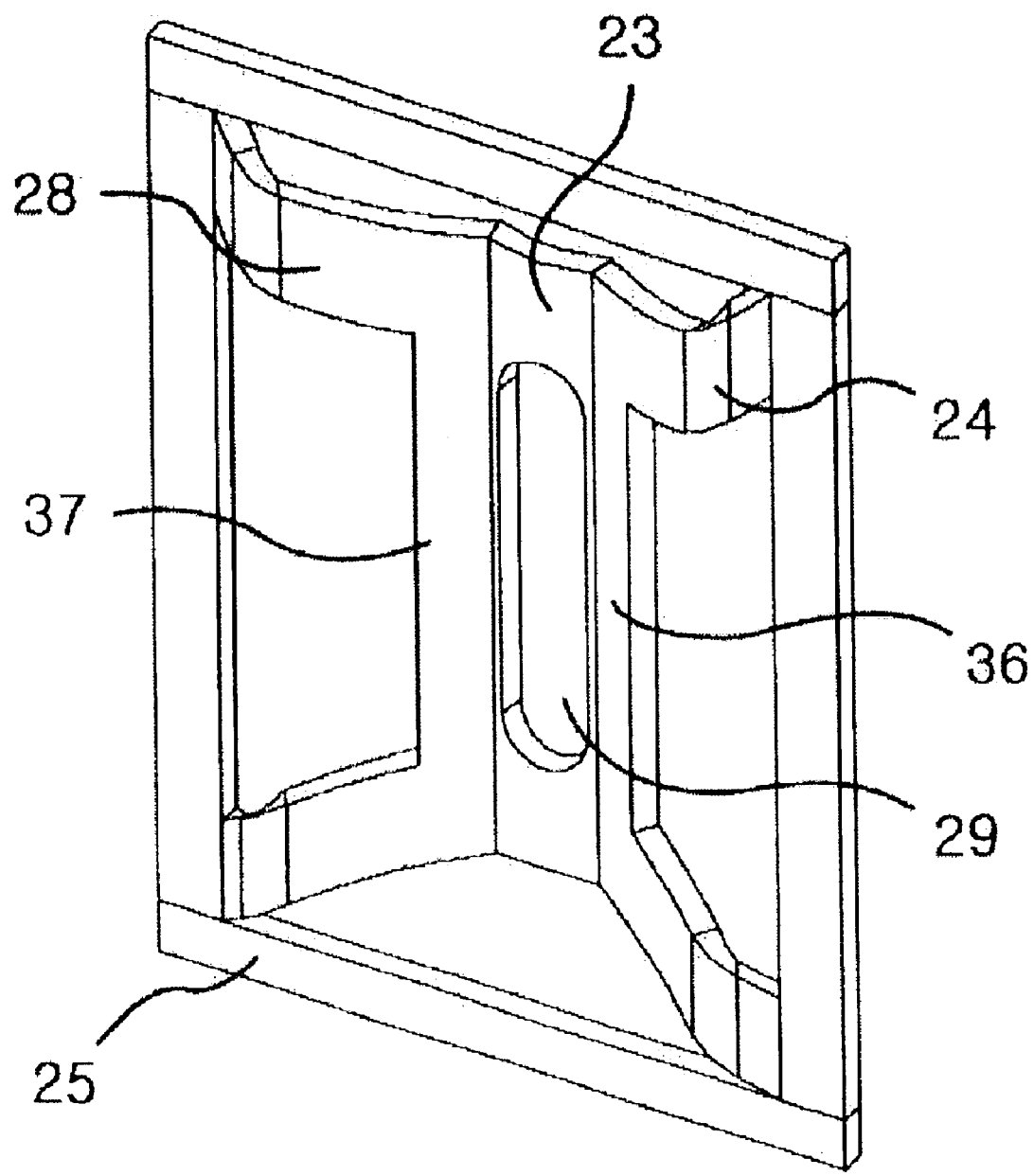
--Fig. 6b--

--Fig. 6c--
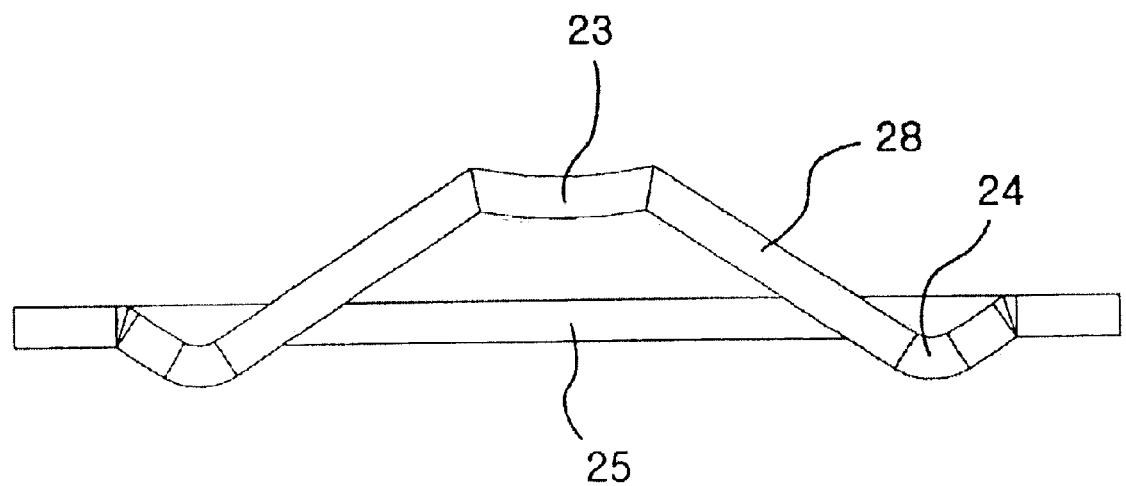
--Fig. 7a--
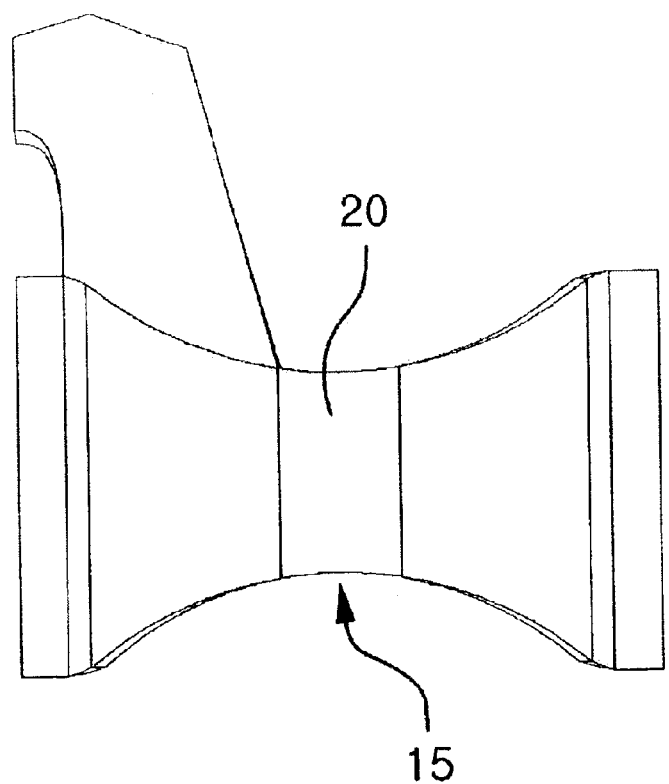

--Fig. 7b--
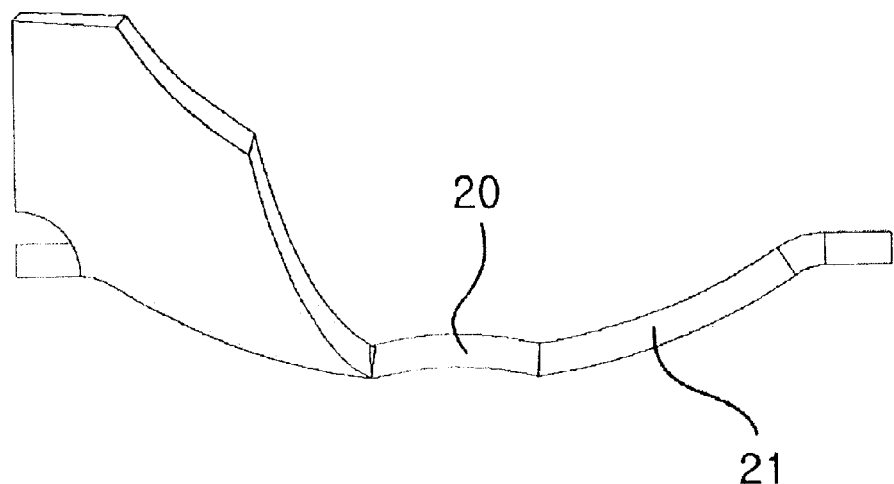
--Fig. 7c--
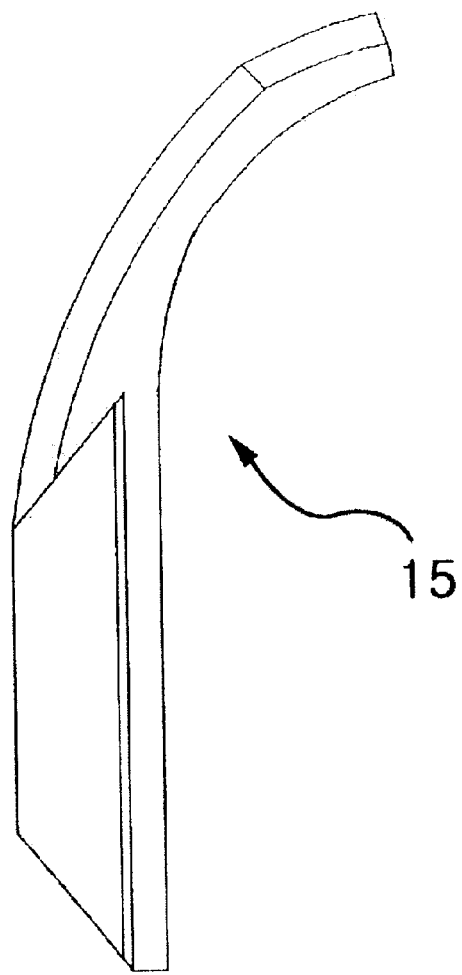

--Fig. 7d--
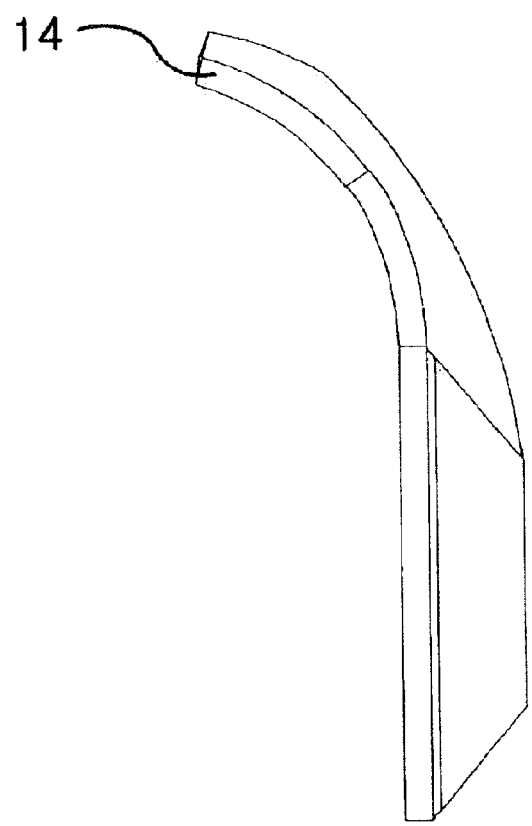
--Fig. 8a--
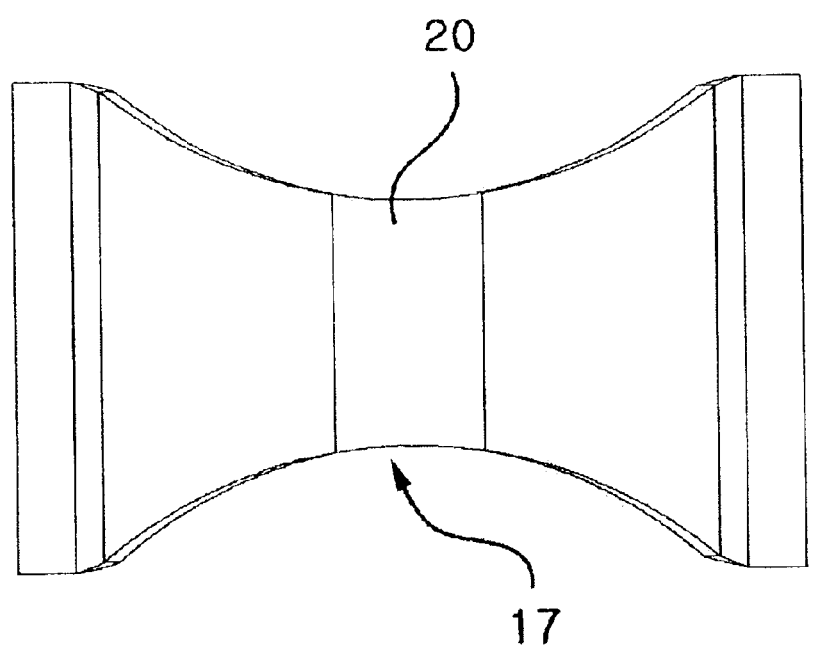

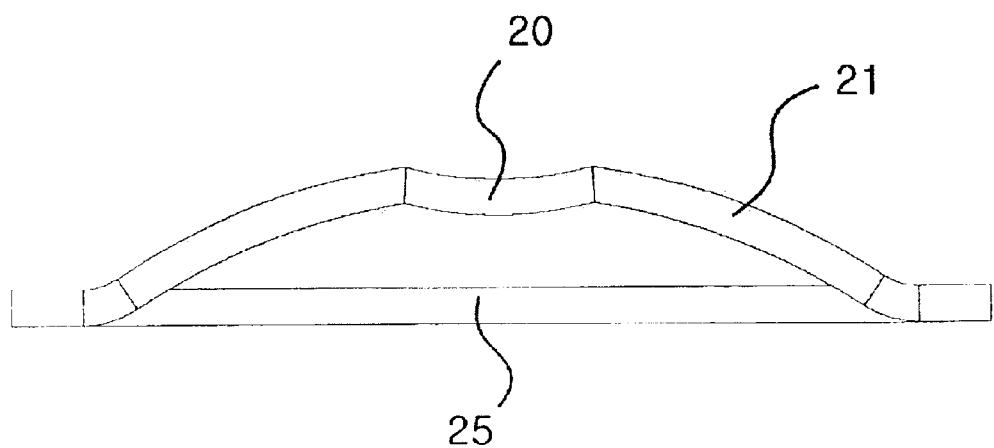
--Fig. 8b--

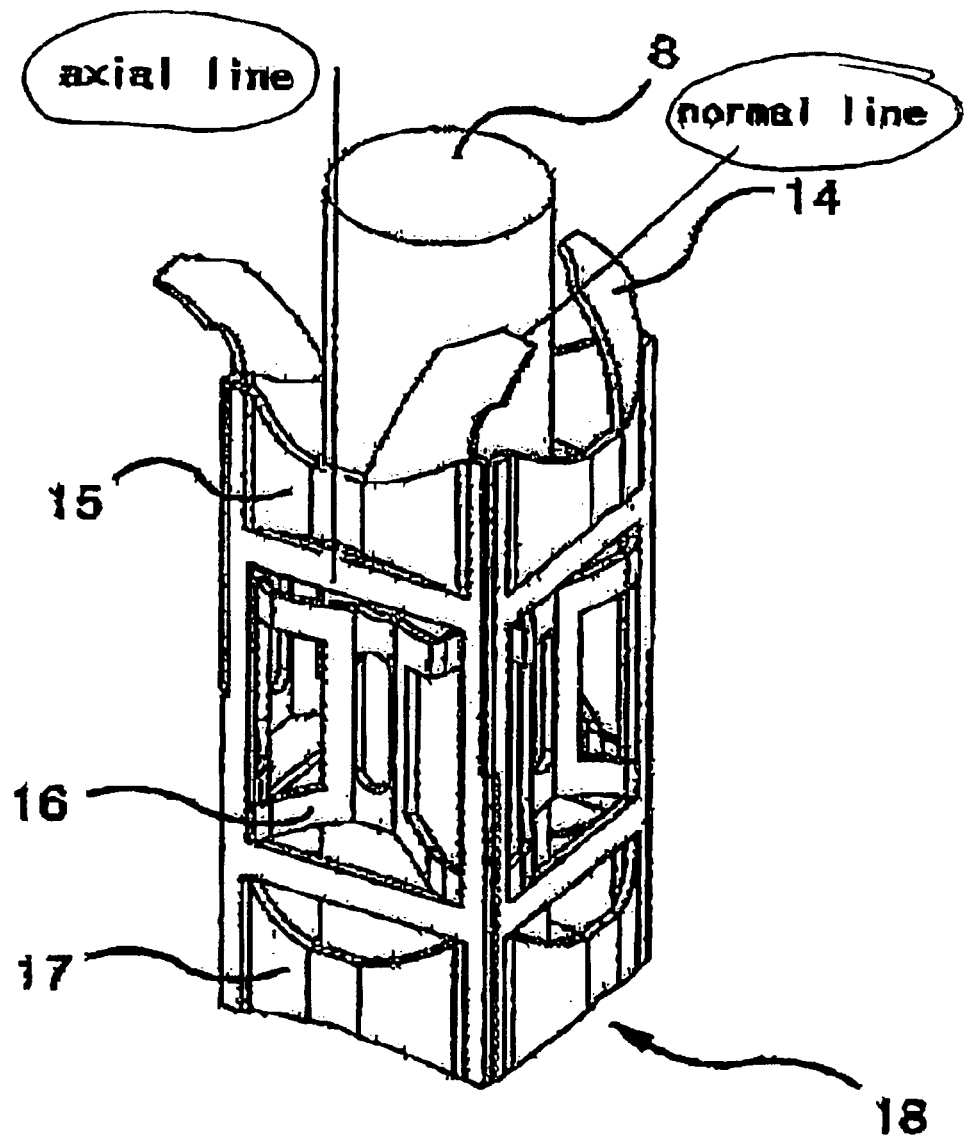

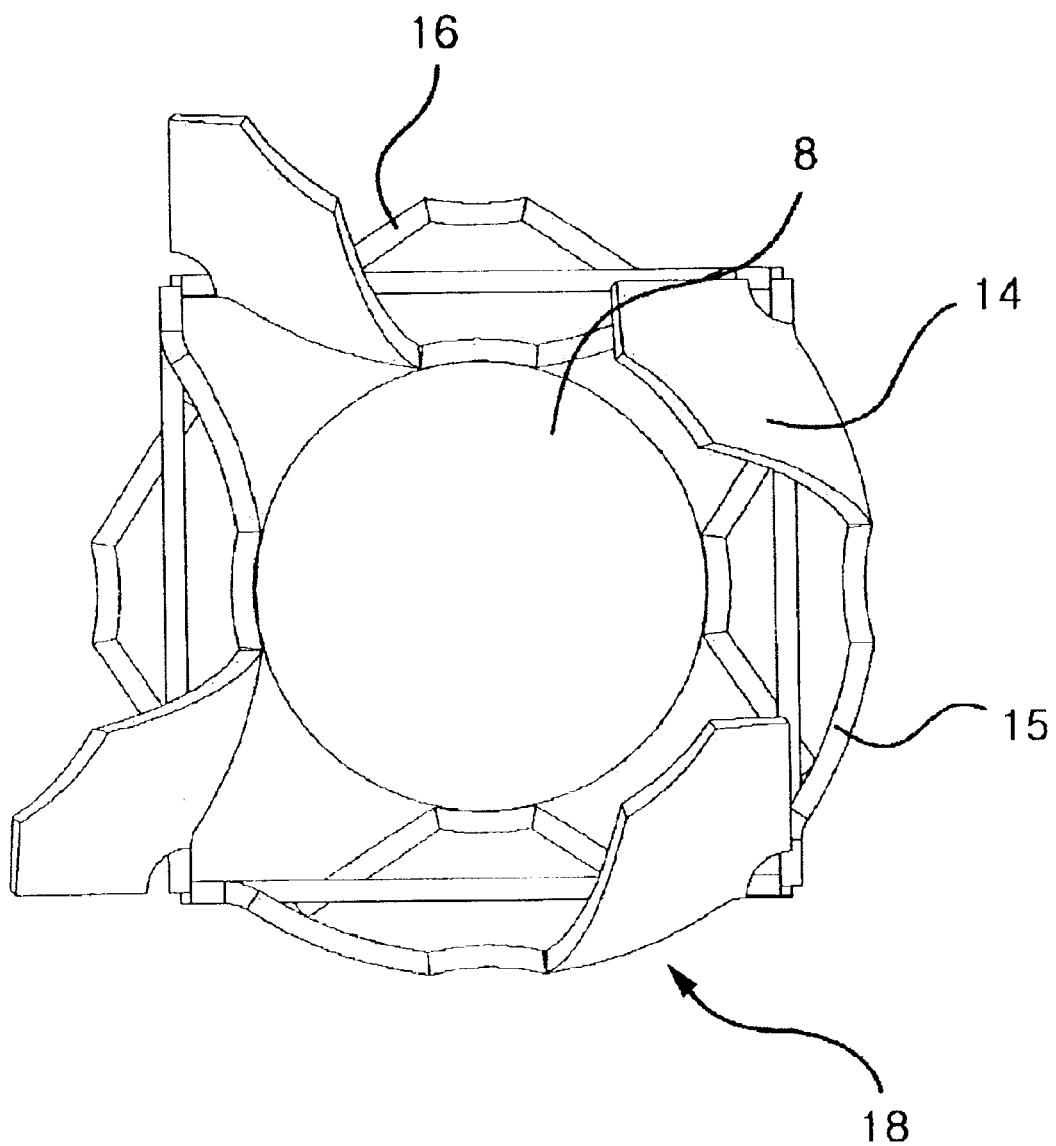
--Fig. 9b--

–– Fig. 9c ––
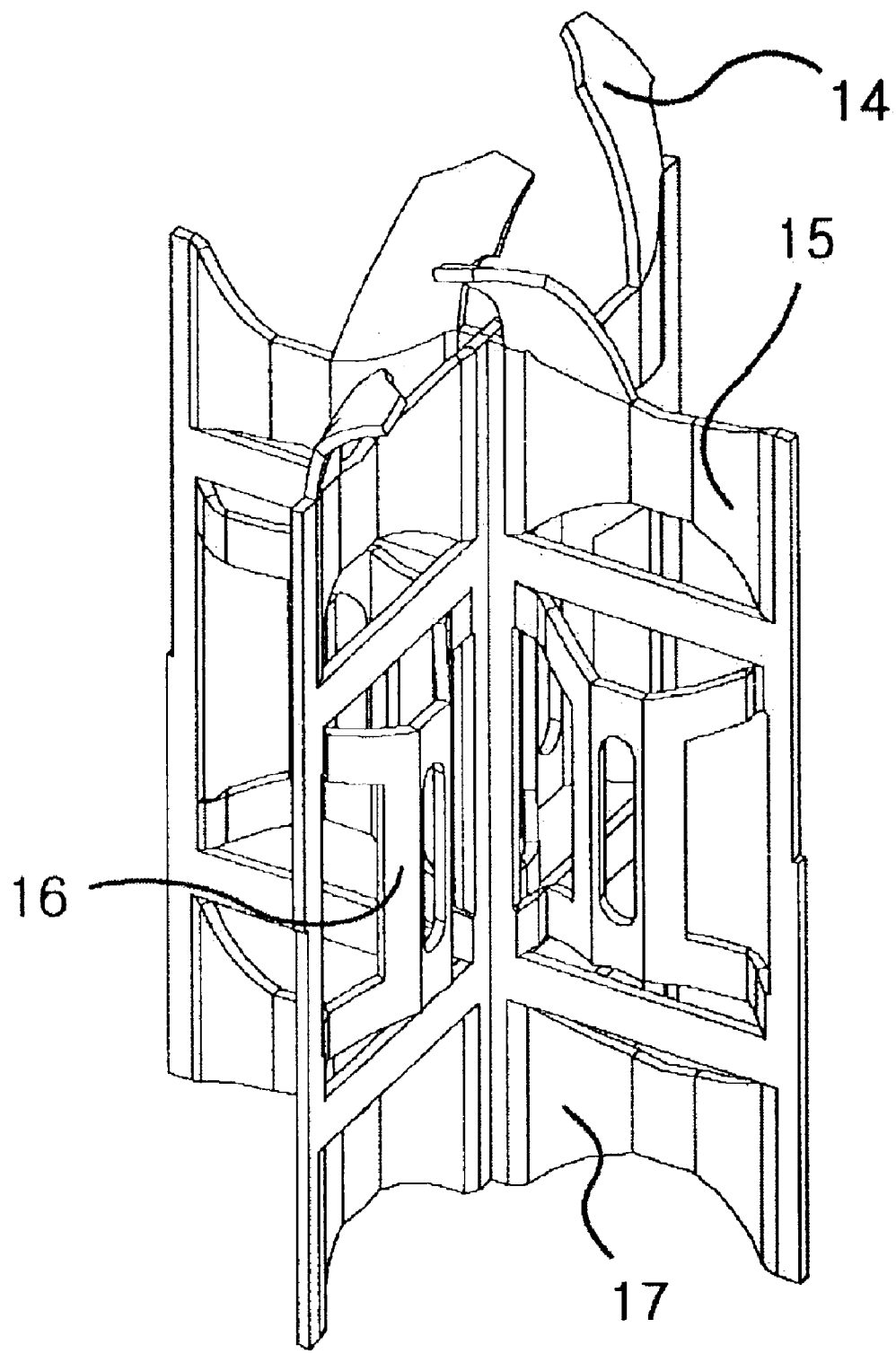

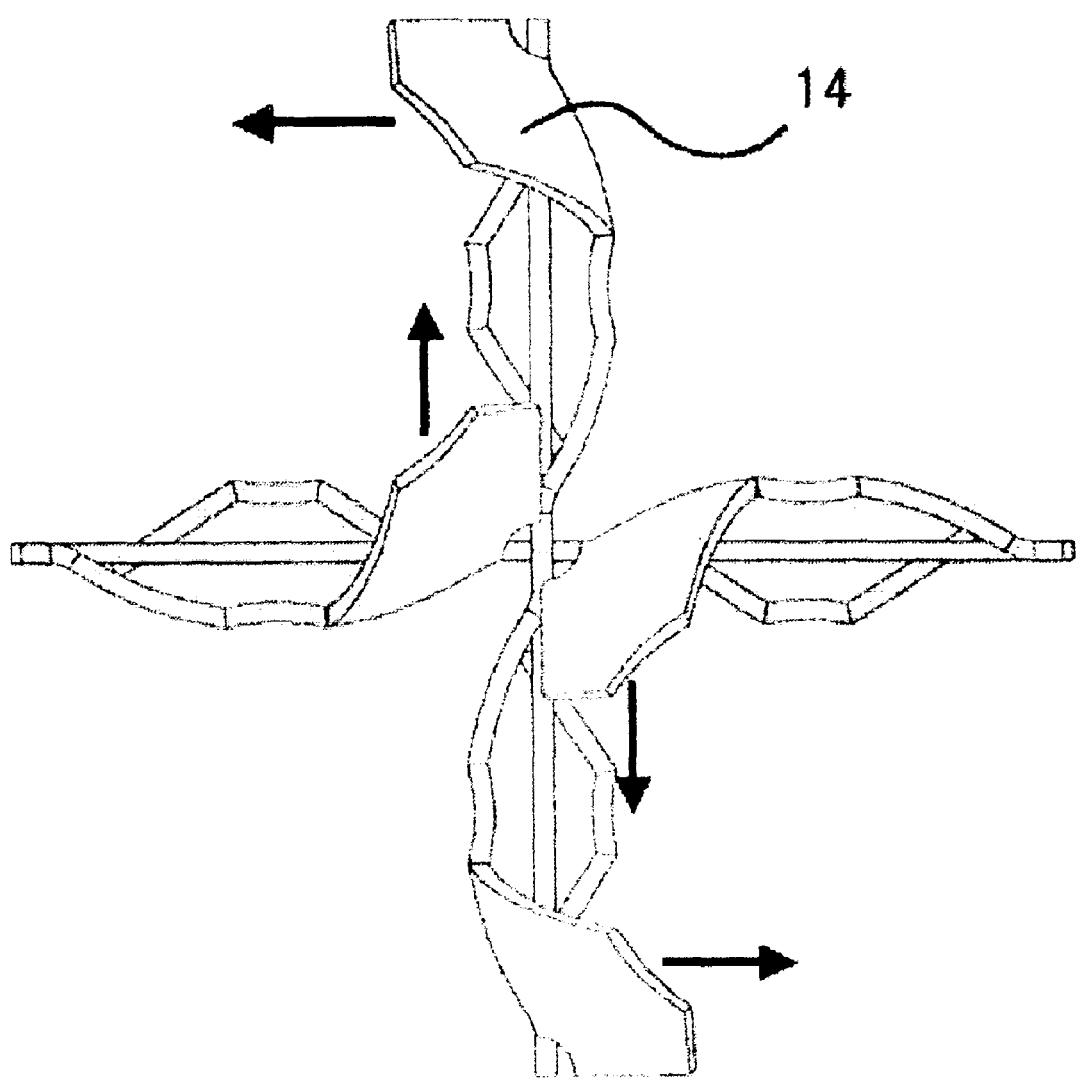
--Fig. 9d--

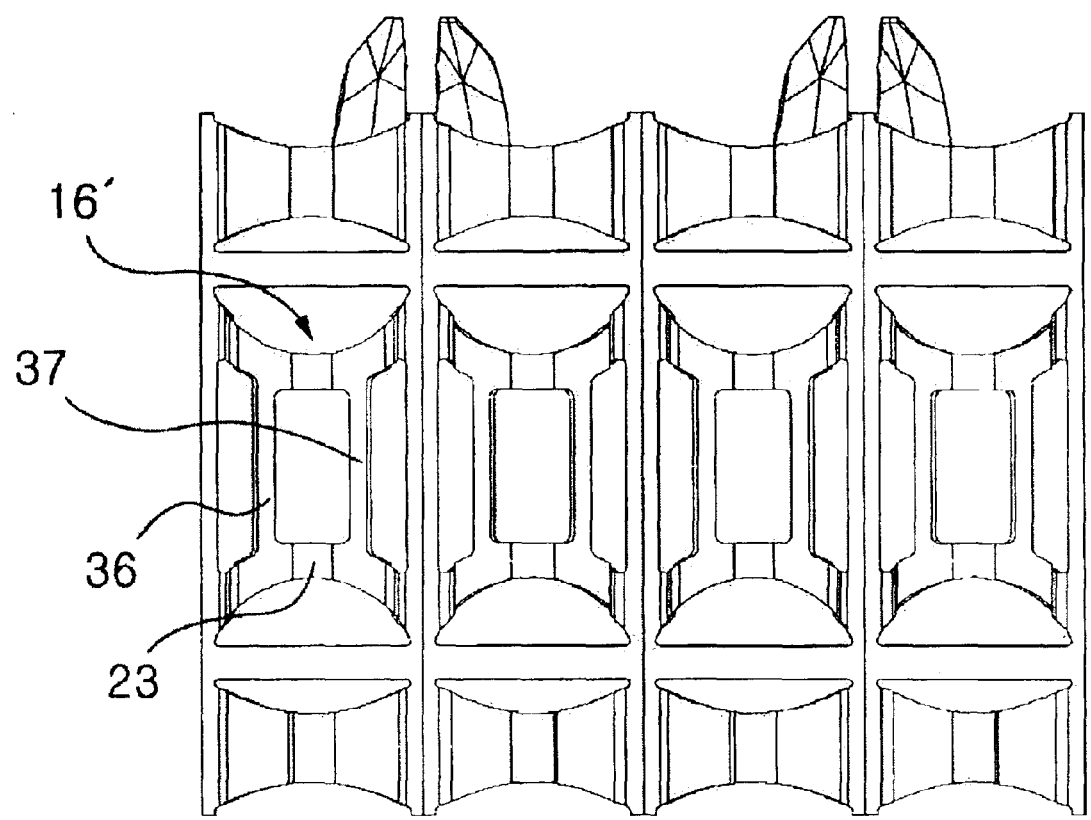
--Fig. 10--

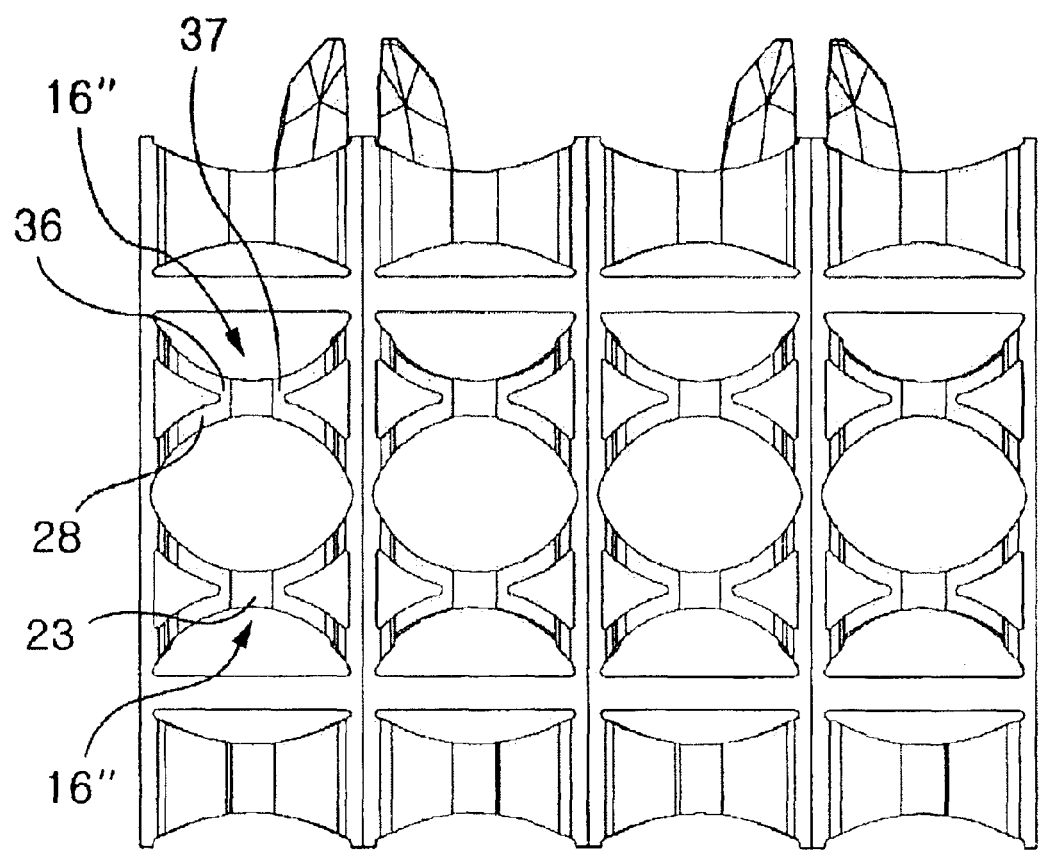
--Fig. 11a--

--Fig. 11b--
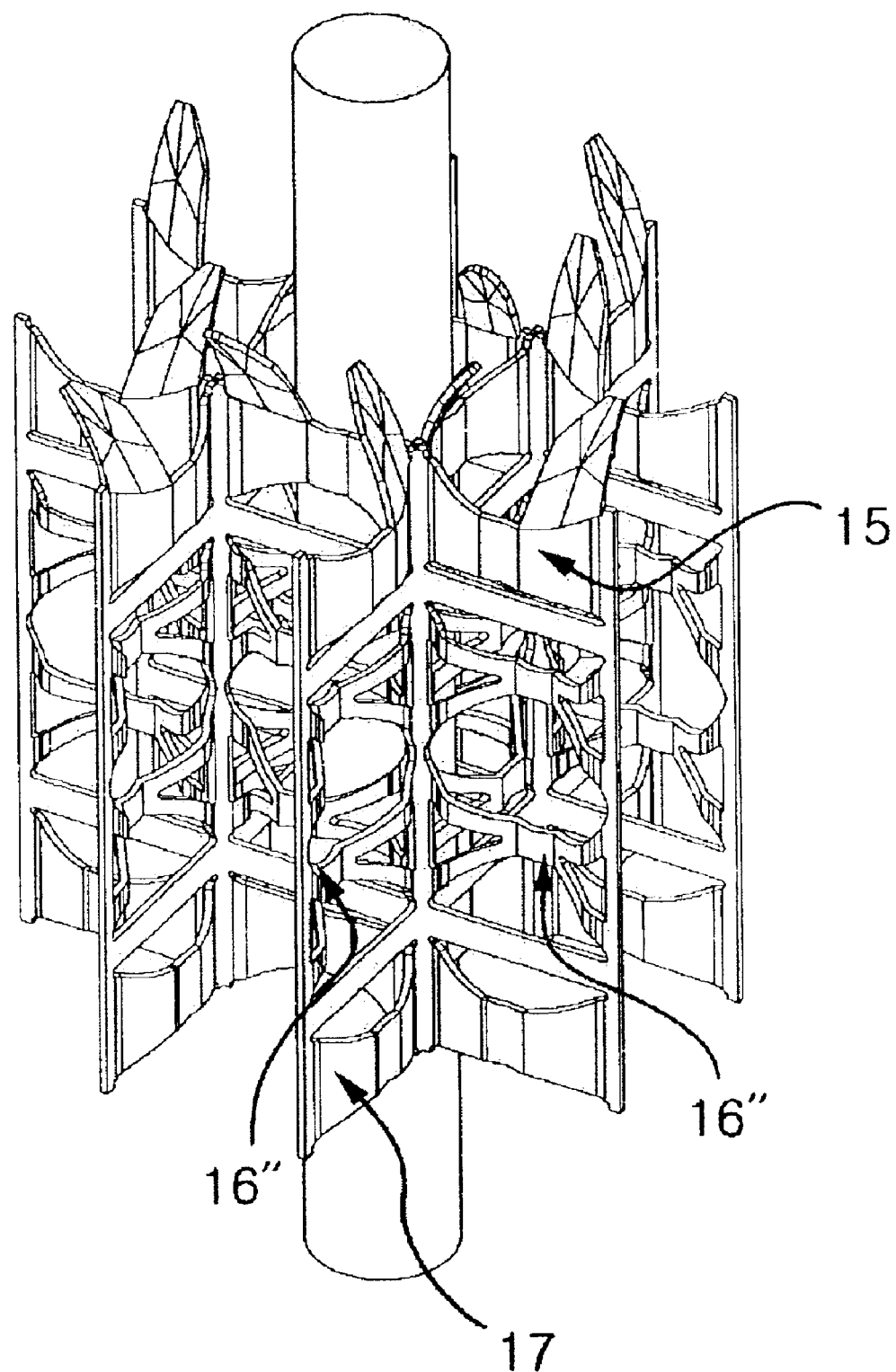

US 6,807,246 B1

LIPS-TYPE MULTI-PURPOSED NUCLEAR FUEL ASSEMBLY SPACER GRID

BACKGROUND OF THE INVENTION

Field of the Invention

The present invention relates, in general, to spacer grids used for supporting fuel rods in a nuclear fuel assembly of a nuclear reactor and, more particularly, to a lips-type multi-purposed spacer grid used in such nuclear fuel assemblies and designed to support fuel rods by springs which are in contact with the fuel rods at equiangular curved contact surfaces having areas larger than those of springs of conventional spacer grids, thus enhancing the fuel rod support performance of spacer grids and accomplishing desired soundness of the spacer grids when the spacer grids support the fuel rods in a nuclear fuel assembly. The spacer grid according to the present invention also has a structure designed such that load applied to the springs is distributed to the entire structure of the spacer grid, and the coolant deflecting area of the spacer grid is increased by mixing blades provided at the upper part of the spacer grid, and the spacer grid has a structure capable of effectively filtering the debris moving along with the coolant.

Description of the Prior Art

FIG. 1 is a perspective view, showing the construction of a conventional nuclear fuel assembly.

In each spacer grid 7 of the nuclear fuel assembly 1, springs and dimples support a plurality of elongated nuclear fuel rods 8 and a plurality of guide tubes 5 so as to maintain the arrangement of the nuclear fuel rods 8 placed at regular intervals in the nuclear fuel assembly 1. That is, the springs and dimples maintain the regular intervals between the nuclear fuel rods 8 while preventing impact-induced deformation of the nuclear fuel rods 8 and the guide tubes 5, thus reliably defining passages for coolant in the fuel assembly 1 and allowing the coolant to effectively cool the fuel rods 8 in a reactor core. A plurality of mixing blades are attached to the upper edges of intersecting strips of each spacer grid 7 so as to mix the thermally imbalanced coolant within the nuclear fuel assembly 1. In addition, the spacer grids 7 may be designed to have a structure capable of effectively filtering debris from the coolant.

The coolant mixing function, the wear and the debris filtering function of the spacer grids 7 are recognized as important factors in development of nuclear fuel assemblies of high burn-up and zero defects. In order to develop the nuclear fuel assemblies of high burn-up and zero defects, it is necessary to enhance the thermal efficiency of the nuclear fuel assemblies. The thermal efficiencies of the nuclear fuel assemblies may be enhanced by improving the flow characteristics of coolant around the fuel rods.

The improvement in the flow characteristics of coolant around the fuel rods may be effectively accomplished by a change of the structure of a spacer grid. That is, the thermal mixing of coolant may be improved by attachment of mixing blades to the spacer grid, a change of the shape of the mixing blades and/or defining appropriately designed coolant channels in the spacer grid. However, the above-mentioned methods of enhancing the thermal efficiencies of nuclear fuel assemblies also generate turbulences in coolant flowing around the fuel rods, and the turbulences of the coolant undesirably cause to vibrate the elongated, parallel, closely spaced fuel rods within the nuclear fuel assembly. When the fuel rods are so vibrated over a lengthy period of time, the claddings of the fuel rods are repeatedly and frictionally abraded at their contact parts at which the fuel rods are brought into contact with the springs and dimples of the spacer grids. The claddings are thus reduced in their thickness so as to be finally perforated at the contact parts. Such an abrasion of the fuel rods is so-called "fretting wear of fuel rods" in the art.

When the spacer grids 7 are exposed to neutron irradiation in the reactor core for a lengthy period of time, the material characteristics of the springs of the spacer grids 7 are changed, and the springs gradually lose their elasticity. The springs in such a case fail to stably and steadily support the fuel rods 8, and so allow the fuel rods 8 to vibrate. The claddings of the fuel rods 8 are thus abraded at the contact parts at which the fuel rods are brought into contact with the springs and dimples of each spacer grid 7, so that the fretting wear of the fuel rods 8 occurs. There have been a lot of reports of leakage of radioactive materials from fuel rods due to perforation of the claddings of the fuel rods 8 caused by the fretting wear. In the art, it has been recognized that the fretting wear of the fuel rods is greatly affected by the design of the spacer grid, including the shapes of contact parts between the fuel rods and the spacer grids.

In the conventional spacer grid 7, the fuel rods 8 are in contact with the springs and dimples in a manner of point contact or linear contact mostly. Of the two contact manners, the linear contact manner confers higher resistance to flow-induced vibration and abrasion of fuel rods, in comparison with the point contact manner, so that the linear contact manner more effectively protects the fuel rods 8 from fretting wear. That is, when the contact surface areas between the fuel rods 8 and the springs and dimples of the spacer grid 7 are increased under the condition that the spring force is not changed, the peak value of contact pressure at the contact parts is reduced such that the fretting wear of the fuel rods 8 is diminished.

In addition, during a process of designing the springs of spacer grids, it is necessary to preset the spring force of each spacer grid while considering expected irradiation-induced changes in the material characteristics of the springs. When the spring force is too low, the springs may fail to accomplish desired soundness of a spacer grid when the spacer grid supports fuel rods. When the spring force is too high, the springs may impose excessive frictional force on the claddings of fuel rods, thus scratching the claddings to damage the claddings during a process of installing the fuel rods in the spacer grid while producing a nuclear fuel assembly. In addition, the springs having such excessively high spring force may cause the fuel rods to be undesirably bent when the fuel rods are elongated due to irradiation-induced growth during an operation of a nuclear reactor. A desired fuel rod support soundness of a spacer grid 7 is accomplished when the springs and dimples of the spacer grid 7 have appropriate spring force.

The power distribution of the fuel rods 8 in the reactor core are unevenly distributed, so that the temperature of coolant flowing around higher power fuel rods 8 is relatively high. When the coolant temperature reaches close to the saturation temperature, an excessive amount of bubbles may be generated at a certain area of the cladding of a fuel rod 8 as much as to cover the cladding, so that the bubble crowding remarkably reduce heat transfer from fuel rod to coolant. In such a case, the temperature of the local area of the cladding covered with the bubbles is quickly increased, so that the cladding or the uranium pellets in the fuel rod 8 may be over-heated up to a melting temperature.

In an effort to suppress the possibility of the above-mentioned problem, the spacer grid 7 is designed to forcibly mix the coolant flowing around the fuel rods 8 of the nuclear fuel assembly 1, thus creating a uniform temperature distribution of the coolant in the nuclear fuel assembly 1 as for as possible and thus enhancing the heat transfer rate of the claddings of the fuel rods 8. The spacer grid 7 thus restricts critical nucleate boiling of the coolant and allows the nuclear reactor to be safely operated for a desired lengthy period of time. In order to accomplish the above-mentioned function, mixing blades as a means for increasing the heat transfer efficiency between the fuel rods 8 and the coolant are attached to the spacer grid 7, as a fuel rod support means.

In the art, coolant mixing effect in a nuclear fuel assembly has been accomplished as follows. In a first method, the coolant mixing may be accomplished by strong vortexes generated in coolants flowing through the coolant passages defined among fuel rods. Due to the strong vortexes, the coolants flowing through the coolant passages of the spacer grid are effectively mixed with each other to accomplish a uniform temperature distribution of coolant in the fuel assembly. Second, swirls flow may be generated in the coolants flowing through the spacer grid, so that the coolant having higher density is centrifugally moved toward the surfaces of the claddings, while the bubbles having lower density are centripetally moved toward the centers of the swirls. The second method using the swirls thus prevents a reduction in the heat transfer caused by the bubbles covering the claddings of the fuel rods, so that the fuel rod cooling performance of the nuclear fuel assembly is enhanced.

Of the two methods, the second method using the swirls is more preferable in that the swirls are more slowly fade out after passing through a spacer grid 7, in comparison with the turbulent vortexes used in the first method, and, therefore, the spacer grids proposed in recent years have been designed on the basis of the second method using the swirls. When the mixing blades are attached to the spacer grid, an increase of pressure loss is caused in the nuclear fuel assembly. Such additional pressure loss in the nuclear fuel assembly increases the hydraulic load imposed on a pump, thus reducing the coolant flowing in the nuclear fuel assembly. Therefore, when attaching the mixing blades to each spacer grid of a nuclear fuel assembly, it is necessary to design the mixing blades so as to minimize the pressure loss in the nuclear fuel assembly under the same projected area of the mixing blades.

In recent years, a debris filtering and/or capturing device is also required at a nuclear fuel assembly in an effort to remove debris from coolant and thereby protect the fuel assembly from damage caused by the debris. A variety of debris, such as small-sized bolts or wire pieces, are moved quickly along with coolant in a reactor core, thus sometimes seriously damaging the fuel rods. In order to solve the problem by filtering the coolant, a filtering device may be mounted to a coolant passage in bottom nozzle 3, or a debris filtering spacer grid specifically designed to filter the debris. In such a case, the filtering spacer grid is designed to minimize its interference with the flow of coolant and capture the debris removed from the coolant in the spacer grid, in place of having a fuel rod support function accomplished by the springs and dimples.

In accordance with an extension of fuel life cycle due to provision of nuclear fuel assemblies of high burn-up and zero defects, the quantity of neutrons irradiated to the spacer grids is increased, so that the problem of irradiation-induced changes in the material characteristics of springs, resulting in a reduction in the spring force, becomes worse. Therefore, in order to provide nuclear fuel assemblies with zero defects in terms of fretting wear, it is necessary to provide a spacer grid having a mechanism capable of compensating for the reduction in the spring force and effectively supporting the fuel rods without allowing flow-induced vibration of the fuel rods.

In some high burn-up nuclear fuels, the level of nuclear fuel enrichment may be increased. The increased nuclear fuel enrichment results in much higher power peak than an average fuel rods. Under this situation, the enhanced heat transfer rate from the claddings may become more important considerably. Therefore, it is necessary to provide an advanced spacer grid having a fuel rod cooling performance higher than that of the conventional spacer grid. In addition, it is also necessary to provide a spacer grid capable of solving the problem of excessive pressure loss caused by mixing blades and preventing damage to fuel rods due to debris.

SUMMARY OF THE INVENTION

Accordingly, the present invention has been made keeping in mind the above problems occurring in the prior art, and an object of the present invention is to provide a lips-type multi-purposed spacer grid for nuclear fuel assemblies, which allows fuel rods to be in contact with springs and dimples of the spacer grid in an equiangular surface contact manner, different from conventional spacer grids, so that contact force generated at equiangular contact surfaces between the fuel rods and the springs and dimples is evenly distributed to the contact surfaces, thus reducing possible fretting wear of the fuel rods due to flow-induced vibration of the fuel rods, and which enlarges the allowable elastic range of the springs, thus allowing the springs to soundly support the fuel rods by using residual spring force.

Another object of the present invention is to provide a lips-type multi-purposed spacer grid for nuclear fuel assemblies, which has a structure designed such that load applied to the springs in longitudinal and latitudinal directions is distributed to the entire structure of the spacer grid, thus reducing peak stress at the contact surfaces between fuel rods and the springs, and which soundly supports the fuel rods regardless of any directional external force applied to the fuel rods or a variation in the pressure field generated in a nuclear fuel assembly, and which has mixing blades provided at the upper edge of dimples, thus minimizing pressure loss and flow interference caused by conventional mixing blades that have been provided on typical spacer grids to generate vortexes or swirls in coolant, and the mixing blades of which each have a spoon-shaped curve and are sized twice as large as conventional mixing blades, so that the coolant deflecting surfaces and the coolant mixing effect of the mixing blades are maximized, and which minimizes pressure loss of the nuclear fuel assembly by controlling the angle of the mixing blades and reducing the number of the mixing blades by a half compared to the conventional spacer grid, so that the fuel rod cooling efficiency is improved, and which has arc-shaped edges at the springs and dimples to define gaps between the springs and dimples, so that lateral passages for the coolant are formed by the gaps between the arc-shaped edges of the springs and dimples and debris from the coolant are captured at the gaps between the springs and dimples, and which thus minimizes damage to the fuel rods due to such debris.

In order to accomplish the above objects, the present invention provides a lips-type multi-purposed spacer grid fabricated by a plurality of two types of inner strips intersecting each other to form a plurality of unit cells, and used for supporting a plurality of fuel rods in a nuclear fuel assembly such that one fuel rod is supported within one unit cell, each of the two types of inner strips being fabricated by integrating a plurality of unit strip parts into a linear strip, and having a plurality of notches at junctions of the unit strip parts such that each notch vertically extends downward or upward, wherein each of the unit strip parts comprises a frame used as a support frame of the unit strip part, at least one water strider-type spring, and upper and lower dimples. The frame comprises two support columns vertically disposed in parallel while being spaced apart from each other at a predetermined interval, and two support beams horizontally extending between the two support columns at upper and lower positions to connect the two support columns to each other and define a middle opening between the support beams and the support columns. The water strider-type spring is provided in the middle opening of the frame while being projected in a direction from a vertical surface formed by the frame, and comprises an equiangular curved part axially formed along the spring and having a predetermined width while being curved within a direction of the width at a radius of curvature corresponding to that of an external surface of each fuel rod, two side extensions extending outward in opposite directions from both sides of the equiangular curved part to a predetermined width while being bent at a predetermined angle, and four spring legs diagonally extending from upper and lower corners of the two side extensions such that the four spring legs are connected to inside edges of the two support columns at four corners of the middle opening of the frame. The upper and lower dimples are provided at positions above and under the water strider-type spring while being projected from the vertical surface formed by the frame in a direction opposed to the projecting direction of the water strider-type spring. The upper dimple is curved along a lower edge thereof to form an arc-shaped lower edge, and the lower dimple is curved along an upper edge thereof to form an arc-shaped upper edge. Each of the upper and lower dimples comprises a curved dimple part axially formed along each dimple and having a predetermined width while being curved within a direction of the width at a radius of curvature corresponding to that of an external surface of each fuel rod, two side dimple extensions extending outward in opposite directions from both sides of the curved dimple part to a predetermined width while being curved at a predetermined angle.

In the lips-type multi-purposed spacer grid, upper and lower edges of the water strider-type spring are curved to form arc-shaped edges which are symmetrical with respect to a horizontal axis of the water strider-type spring.

In an embodiment, one water strider-type spring comprised of a long equiangular curved part and two long side extensions is provided in the middle opening of the frame.

In another embodiment, two water strider-type springs, each comprising a short equiangular curved part and two short side extensions, are provided at upper and lower portions inside the middle opening of the frame.

In the spacer grid, a mixing blade extends upward to a predetermined length from a side of an upper edge of the upper dimple.

BRIEF DESCRIPTION OF THE DRAWINGS

The above and other objects, features and other advantages of the present invention will be more clearly understood from the following detailed description taken in conjunction with the accompanying drawings, in which:

FIG. 1 is an exploded perspective view, showing the construction of a conventional nuclear fuel assembly;

FIG. 2 is a perspective view of a lips-type multi-purposed spacer grid for nuclear fuel assemblies according to a primary embodiment of the present invention;

FIGS. 3a and 3b are front views of two types of inner strips constituting the spacer grid according to the present invention;

FIGS. 4a and 4b are a plan view and a bottom view of the spacer grid according to the present invention, respectively;

FIG. 5 is a front view of a unit strip part constituting an inner strip used in the spacer grid according to the present invention;

FIGS. 6a, 6b and 6c are a front view, a perspective view and a plan sectional view of a water strider-type spring included in the inner strips constituting the spacer grid according to the present invention, respectively;

FIGS. 7a, 7b, 7c and 7d are a front view, a plan view, a left side view and a right side view of an upper dimple having a mixing blade included in the inner strips constituting the spacer grid according to the present invention, respectively;

FIGS. 8a and 8b are a front view and a bottom view of a lower dimple included in the inner strips constituting the spacer grid according to the present invention, respectively;

FIGS. 9a and 9b are a perspective view and a plan view of a four-walled unit cell of the spacer grid according to the present invention, with a fuel rod supported within the cell, respectively;

FIGS. 9c and 9d are a perspective view and a plan view of intersecting inner strips of the spacer grid according to the present invention, respectively;

FIG. 10 is a front view of an inner strip constituting a lips-type multi-purposed spacer grid for nuclear fuel assemblies according to a second embodiment of the present invention; and FIG. 11a is a front view of an inner strip constituting a lips-type multi-purposed spacer grid for nuclear fuel assemblies according to a third embodiment of the present invention, and FIG. 11b is a perspective view of the lips-type multi-purposed spacer grid fabricated by intersecting the inner strips of FIG. 11a.

DESCRIPTION OF THE PREFERRED EMBODIMENTS

Reference should now be made to the drawings, in which the same reference numerals are used throughout the different drawings to designate the same or similar components.

As shown in the accompanying drawings, a lips-type multi-purposed spacer grid 50 according to the present invention receives and supports a plurality of elongated nuclear fuel rods 8 at positions spaced at regular intervals in a nuclear fuel assembly, and comprises a plurality of two types of inner strips 12 and 13. The two types of inner strips 12 and 13 intersect each other at right angles in accordance with a designed array, thus forming the spacer grid 50 with a plurality of four-walled unit cells for receiving and supporting the elongated nuclear fuel rods 8, as shown in FIGS. 2, 4a and 4b. Each of the inner strips 12 and 13 is fabricated, as shown in FIGS. 3a and 3b, by integrating a plurality of unit strip parts 45 into a linear strip, and each of the unit strip parts 45 is comprised of a water strider-type spring 16, an upper dimple 15 and a lower dimple 17, as will be described later herein. The inner strips 12 and 13 each have a plurality of notches at the junctions of the unit strip parts 45 such that each notch having a predetermined length vertically extends downward or upward. In the nuclear fuel assembly, one fuel rod 8 is received and supported within one cell.

As shown in FIGS. 5 to 7d, each of the unit strip parts 45 constituting the inner strips 12 and 13 is comprised of a frame used as a support frame of the unit strip part 45, the water strider-type spring 16 formed in an opening defined at the middle part of the frame, and the upper and lower dimples 15 and 17 provided at the upper and lower parts of the frame, respectively. That is, the upper and lower dimples 15 and 17 are formed at positions above and under the water strider-type spring 16 in each unit strip part 45. The unit strip part 45 also has a mixing blade 14. The mixing blade 14 extends upward to a predetermined length from a side of the upper edge of the upper dimple 15, as best seen in FIG. 5.

In the spacer grid 50 according to the present invention, the spring 16 has a shape similar to the profile of a water strider that is an aquatic insect of the family Gerridae, having six slender legs fringed with hairs, enabling the insect to dart about on the surface of water. Of the six legs of the water strider, four long legs except for two relatively short forelegs extend from the body in diagonal directions in a manner similar to that of the spring 16, so the spring 16 is a so-called "water strider-type spring".

The frame of each unit strip part 45 is comprised of two vertical support columns 40 and two horizontal support beams 25. The two support columns 40 are vertically disposed in parallel while being spaced apart from each other at a predetermined interval. The two horizontal support beams 25 horizontally extend between the two columns 40 at vertically symmetrical upper and lower positions, thus connecting the two columns 40 to each other and defining a rectangular middle opening between the beams 25 and the columns 40. An upper opening which is open upward is defined between the two columns 40 and the upper beam 25, and a lower opening which is open downward is defined between the two columns 40 and the lower beam 25.

The water strider-type spring 16 is formed in the rectangular middle opening of the frame. As shown in FIGS. 6a to 6c, the water strider-type spring 16 is comprised of an equiangular curved part 23, two side extensions 36 and 37, and four spring legs 28. The equiangular curved part 23 is axially formed along the central axis of the spring 16, and has a predetermined width while being curved within the direction of the width at a radius of curvature allowing the equiangular curved part 23 of the spring 16 to come into surface contact with the cladding of a fuel rod 8. The two side extensions 36 and 37 extend outward to a predetermined width while being bent at a predetermined angle in opposite directions from both sides of the equiangular curved part 23. The four spring legs 28 diagonally extend from upper and lower corners of the two side extensions 36 and 37. The four spring legs 28 are connected to the inside edges of the frame at the four corners of the rectangular middle opening of the frame. The four spring legs 28 are thus integrated with the frame of the unit strip part 45 at four points, so that the water strider-type spring 16 has a four point support structure in which the spring 16 supports a fuel rod at the four points. The spring 16 is also projected in a direction from a vertical surface formed by the frame.

The upper and lower dimples 15 and 17 are formed at positions above and under the water strider-type spring 16 in each unit strip part 45. As shown in FIGS. 7a to 8b, each of the upper and lower dimples 15 and 17 is comprised of a curved dimple part 20 and two side dimple extensions 21. The curved dimple part 20 is axially formed along the central axis of each dimple 15, 17, and has a predetermined width while being curved within the direction of the width at a radius of curvature allowing the curved dimple part 20 to come into surface contact with the cladding of the fuel rod 8. The two side dimple extensions 21 extend outward in opposite directions from both sides of the curved dimple part 20 to a predetermined width is while being curved at a predetermined angle.

The upper dimple 15 is curved along the lower edge thereof to form an arc-shaped lower edge 32, while the lower dimple 17 is curved along the upper edge thereof to form an arc-shaped upper edge 31. The upper and lower dimples 15 and 17 are also projected from the vertical surface formed by the frame in a direction opposed to the projecting direction of the water strider-type spring 16.

The radius of curvature of the equiangular curved part 23 of the water strider-type spring 16 is determined to be slightly larger than that of the cladding of each fuel rod 8, so that the equiangular curved part 23 comes into close surface contact with the cladding of the fuel rod 8 and soundly supports the fuel rod 8 even when the fuel rod 8 vibrates or is impacted by external force. That is, the radius of curvature of the equiangular curved part 23 is designed to be slightly larger than that of the cladding of each fuel rod 8 before the fuel rod 8 is installed in a unit cell of the spacer grid. However, after the fuel rod 8 is installed in the unit cell of the spacer grid, the radius of curvature of the equiangular curved part 23 becomes equal to that of the cladding because the cladding pushes the spring 16 in a direction opposed to the projecting direction of the spring 16.

An axial opening 29 is formed along the central axis of the equiangular curved part 23 to have a slender appearance, so that coolant is completely collected in the gap between the cladding of the fuel rod 8 and the equiangular curved part 23. Therefore, it is possible to prevent disturbance of heat transfer at a part of the cladding-due to the coolant remaining at the gap between the cladding and the equiangular curved part 23, so that the spacer grid does not cause nucleate boiling at the claddings of fuel rods 8.

The four spring legs 28 of the water strider-type spring 16 may have bent parts 24 at which the spring legs 28 are bent in a direction opposed to the bent direction of the two side extensions 36 and 37. In such a case, the bent parts 24 of the spring legs 28 are projected from the vertical surface formed by the frame in a direction opposed to the projecting direction of the equiangular curved part 23. In addition, it is possible to control the fuel rod support force of the water strider-type spring 16 by adjusting the bent angle of the bent parts 24.

The upper and lower edges of the water strider-type spring 16 are curved to form arc-shaped edges 38 which are symmetrical with respect to a horizontal axis of the spring 16. That is, the upper edge of the spring 16, formed by the upper edges of the equiangular curved part 23, the two side extensions 36 and 37 and the two upper spring legs 28, is downwardly curved to form an arc-shaped edge. In the same manner, the lower edge of the spring 16, formed by the lower edges of the equiangular curved part 23, the two side extensions 36 and 37 and the two lower spring legs 28, is upwardly curved to form an arc-shaped edge. The arc-shaped upper and lower edges of the water strider-type spring 16 are symmetrical with respect to the horizontal axis of the spring 16.

Therefore, when the spacer grid of the present invention fabricated by the intersecting inner strips 12 and 13 is sectioned along a horizontal direction as shown in FIG. 4b, each of the water strider-type springs 16 is viewed in the form of a lower lip, while each of the upper and lower dimples 15 and 17 is viewed in the form of an upper lip. In each unit strip part 45 of the spacer grid, the water strider-type spring 16 is projected in a direction opposed to that of the upper and lower dimples 15 and 17, so that the spring 16 and the dimples 12 and 13 of each unit strip part 45 support different fuel rods 8, separately. In addition, when the spring 16 and the dimples 12 and 13 of each unit strip part 45 are viewed from the top or the bottom of the spacer grid, they form a pair of lips.

As shown in FIGS. 9a to 9d, the mixing blade 14 extends upward to a predetermined length from the upper edge of one side dimple extension 21 of the upper dimple 15 while being smoothly curved in the same direction as the projecting direction of the water strider-type spring 16. The mixing blade 14 thus has a spoon-shaped configuration which is concave at a side surface thereof facing the fuel rod 8. It is preferable to determine the bent angle of the mixing blade 14 relative to a vertical surface of the unit strip part to 90° or less. That is, the mixing blade 14 is curved such that an acute angle is formed between a normal line at the uppermost end of the mixing blade 14 and an axial line of the side dimple extension 21 of the upper dimple 15.

In addition, the upper edge of each mixing blade 14 is placed along a circle which has a radius larger than that of the cladding of a fuel rod 8, as shown in FIG. 9b, so that the mixing blades 14 do not scratch or damage the cladding of the fuel rod 8 during a process of installing fuel rods 8 in the spacer grid while producing a nuclear fuel assembly. In order to space the mixing blades 14 apart from the cladding of the fuel rod 8, the upper edges of the mixing blades 14 are designed such that they are placed along a circle having a diameter larger than that of the cladding.

As shown in FIGS. 4a and 4b, the lips-type multi-purpose spacer grid 50 according to the present invention is fabricated by the two types of inner strips 12 and 13 which are each comprised of a plurality of unit strip parts 45 integrated into a linear strip, and which intersect each other at right angles to form a plurality of four-walled unit cells in the spacer grid 50 for receiving and supporting the elongated nuclear fuel rods 8 such that one fuel rod 8 is received and supported within one cell.

The water strider-type spring 16 of each unit strip part 45 is projected from a vertical surface formed by the frame of the unit strip part 45 in a direction opposed to the projecting direction of the upper and lower dimples 15 and 17. Therefore, within each four-walled unit cell of the spacer grid 50 defined by four unit strip parts 45, the two water strider-type springs 16 of two neighboring unit strip parts 45 meeting each other at a right angle are projected toward the center of the unit cell, and the upper and lower dimples 15 and 17 of the remaining two unit strip parts 45 are projected toward the center of the unit cell. The fuel rod 8, installed within the four-walled unit cell of the spacer grid 50, is thus supported at six points by the two springs 16 and the four dimples 15 and 17.

In addition, the mixing blade 14 of each unit strip part 45 extends upward from the upper dimple 15 while being smoothly curved in the same direction as that of the water strider-type spring 16 of the unit strip part 45. Therefore, the mixing blades 14 of unit strip parts 45,are directed toward fuel rods 8 installed in neighboring unit cells.

When viewing the spacer grid 50 of the present invention from the top as shown in FIG. 4a, the upper dimples 15 and the water strider-type springs 16 support the fuel rods 8 while being curved at their fuel rod contact surfaces at the same radius of curvature as that of the claddings of the fuel rods 8, and the mixing blades 14 extending from the upper dimples 15 are outwardly curved to be directed over neighboring unit cells. When viewing the spacer grid 50 from the bottom as shown in FIG. 4b, the lower dimples 17 and the: water strider-type springs 16 support the fuel rods 8 while being curved at their fuel rod contact surfaces at the same radius of curvature as that of the claddings of the fuel rods 8.

FIGS. 9a and 9b show a four-walled unit cell 18 of the spacer grid according to the present invention, with a fuel rod 8 supported within the cell 18. Particularly, these drawings show the surface contact between the fuel rod 8 and the water strider-type springs 16 and the upper and lower dimples 15 and 17 of unit strip parts 45 defining the four-walled unit cell 18. FIG. 9d shows currents of coolant guided by the mixing blades 14 of the intersecting strips 12 and 13. Due to the mixing blades 14, the spacer grid 50 forcibly mixes coolants flowing through the coolant passages of the spacer grid, thus enhancing the fuel rod cooling efficiency of the nuclear fuel assembly.

Since the upper dimple 15 has the arc-shaped lower edge 32, and the lower dimple 17 has the arc-shaped upper edge 31, it is possible to reduce pressure loss inside the spacer grid 50. In addition, the spacer grid 50 of the present invention does not have any horizontal support beam at a position under the lower dimple 17, different from conventional spacer grids, so that the inventive spacer grid 50 effectively removes impurities from coolant when the coolant having the impurities flows into the spacer grid 50 through the lower end of the spacer grid 50.

The equiangular curved part 23 of each water strider-type spring 16 is axially formed along the central axis of the spring 16 such that the curved part 23 has a substantial length. Therefore, the fuel rod support surface of the springs 16 is enlarged, and the fuel rod support force of the springs 16 is increased. Soundness of the spacer grid 50 supporting the fuel rods 8 within a nuclear fuel assembly is thus improved. Another advantage of the spacer grid 50 according to the present invention resides in that load, applied to the water strider-type spring 16 of each unit strip part 45 from a fuel rod 8 through the equiangular curved part 23, is effectively distributed to the entire structure of the unit strip parts 45 through the four spring legs 28.

FIG. 10 shows an inner strip constituting a lips-type multi-purpose spacer grid for nuclear fuel assemblies according to a second embodiment of the present invention. As shown in the drawing, the water strider-type spring 16' provided in each unit strip part of the inner strip constituting the spacer grid according to the second embodiment is designed such that the width of the axial opening formed along the central axis of the equiangular curved part 23 is enlarged to reduce the width of the two side extensions 36 and 37. The spacer grid according to the second embodiment of the present invention improves heat transfer efficiency thereof, thus more effectively transferring heat from the claddings of fuel rods to coolant. In this embodiment, the size of the axial opening of the equiangular curved part 23 may be adjusted in an effort to control the fuel rod support force of the water strider-type spring 16', thus improving the fuel rod support force of the springs 16' and soundness of the spacer grid supporting the fuel rods in a nuclear fuel assembly.

FIGS. 11a and 11b show an inner strip according to a third embodiment of the present invention, and a lips-type multi-purposed spacer grid fabricated by intersecting the inner strips, respectively.

As shown in the drawings, each unit strip part of the inner strip according to the third embodiment is designed such that two water strider-type springs 16", each having a short equiangular curved part 23, two short side extensions 36 and 37, and four short spring legs 28, are formed at upper and lower portions inside the rectangular middle opening of the unit strip part. Therefore, a fuel rod 8, installed within a four-walled unit cell of the spacer grid, is supported at eight points by four water strider-type springs 16" and four dimples, so that the spacer grid more stably supports the fuel rods inside a nuclear fuel assembly. In addition, even though one of the two springs 16" of each unit strip part is broken by, for example, impurities, the remaining spring 16" effectively supports the fuel rod, so that soundness of the spacer grid supporting the fuel rods is improved.

As described above, the present invention provides a lips-type multi-purposed spacer grid for nuclear fuel assemblies. In the spacer grid of the present invention, fuel rods are in contact with dimples and water strider-type springs in an equiangular surface contact manner. The spacer grid thus soundly supports the fuel rods even when the fuel rods are excessively loaded in any direction due to a variation in operational conditions of a nuclear reactor. Particularly, the fuel rod support surface of the springs is enlarged, and the fuel rod support force of the springs is increased. Soundness of the spacer grid supporting the fuel rods within a nuclear fuel assembly is thus improved, and the spacer grid reduces possible fretting wear of the fuel rods due to hydraulic vibration of the fuel rods.

The springs of the inventive spacer grid each have four spring legs designed in the form of four long slender legs of a water strider. In addition, the four legs of the water strider-type spring each have a bent part which appropriately controls the fuel rod support spring force of the water strider-type spring, and enlarges the allowable elastic range of the spring.

The upper and lower edges of the water strider-type spring are curved to form arc-shaped edges which are symmetrical with respect to a horizontal axis of the spring. Due to the arc-shaped upper and lower edges of the water strider-type spring, the torsion applied to the spring from a fuel rod through the equiangular curved part is effectively distributed to the entire structure of the unit strip part, so that the spacer grid effectively supports the fuel rods during an operation of a nuclear reactor.

An axial opening is formed in the equiangular curved part of the water strider-type spring, so that it is possible to prevent disturbance of heat transfer at a part of the cladding due to coolant remaining at a gap between the cladding and the equiangular curved part. Therefore, the spacer grid does not cause nucleate boiling at the claddings of the fuel rods. It is also possible to control the fuel rod support spring force of the spacer grid to a desired level by appropriately changing the size of the axial opening formed at the equiangular curved part of the water strider-type spring. It is thus not necessary to impose excessive force on the fuel rods when installing or removing the fuel rods in or from the spacer grid, so that the claddings of the fuel rods are less likely to be scratched or damaged by the springs of the spacer grid. The claddings of the fuel rods are thus prevented from corrosion caused by such scratched or damaged parts. This results in an extension of life spans of the fuel rods.

In addition, a mixing blade extends upward from the upper edge of an upper dimple while being smoothly curved to have a spoon-shaped configuration, so that the mixing blade changes the axial flow of coolant to a lateral flow within each unit four-walled cell of the spacer grid, thus effectively mixing the coolant within the spacer grid. Since the upper dimple has an arc-shaped lower edge, and the lower dimple has an arc-shaped upper edge, it is possible to reduce pressure loss inside the spacer grid. In addition, the flow direction of coolant flowed in from at the lower end of the spacer grid is changed, and the debris of coolant is guided to the gaps between the dimples and the water strider-type springs of the spacer grid, so that debris are effectively captured at the gaps. The spacer grid thus minimizes damage to the fuel rods due to such debris.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A multi-purposed spacer grid fabricated by a plurality of two types of inner strips intersecting each other to form a plurality of unit cells, and used for supporting a plurality of fuel rods in a nuclear fuel assembly such that one fuel rod is supported within one unit cell, each of said two types of inner strips being fabricated by integrating a plurality of unit-strip parts into a linear strip, and having a plurality of notches at junctions of the unit strip parts such that each notch vertically extends downward or upward, wherein each of said unit strip parts comprises:

a frame used as a support frame of the unit strip part, said frame comprising:

two support columns vertically disposed in parallel while being spaced apart from each other at a predetermined interval; and two support beams horizontally extending between the two support columns at upper and lower positions to connect the two support columns to each other and define a middle opening between the support beams and the support columns;

at least one spring provided in the middle opening of the frame while being projected in a direction from a vertical surface formed by the frame, said spring comprising:

a curved part axially formed along the spring and having a predetermined width while being curved within a direction of the width;

two side extensions extending outward in opposite directions from both sides of the curved part to a predetermined width while being bent at a predetermined angle; and four spring legs diagonally extending from upper and lower corners of the two side extensions, said four spring legs being connected to inside edges of the frame at four corners of the middle opening of the frame and being bent in a direction opposed to the bent direction of the two side extensions; and upper and lower dimples provided at positions above and under the spring while being projected from the vertical surface formed by the frame in a direction opposed to the projecting direction of the spring, said upper dimple being curved along a lower edge thereof to form an arc-shaped lower edge, and the lower dimple being curved along an upper edge thereof to form an arc-shaped upper edge, each of said upper and lower dimples comprising:

a curved dimple part axially formed along each dimple, and having a predetermined width while being curved within a direction of the width at a radius of curvature corresponding to that of an external surface of each fuel rod; and two side dimple extensions extending outward in opposite directions from both sides of the curved dimple part to a predetermined width while being curved at a predetermined angle.

2. The multi-purposed spacer grid according to claim 1, wherein upper and lower edges of the spring are curved to form arc-shaped edges which are symmetrical with respect to a horizontal axis of the spring.

3. The multi-purposed spacer grid according to claim 1, wherein the bent parts of the spring legs are projected from the vertical surface formed by the frame in a direction opposed to the projecting direction of the curved part.

4. The multi-purposed spacer grid according to claim 3, wherein one spring comprising a curved part and two side extensions is provided in the middle opening of the frame.

5. The multi-purposed spacer grid according to claim 4, wherein an axial opening is formed along the curved part of the spring.

6. The multi-purposed spacer grid according to claim 5, wherein the axial opening is enlarged in a direction of a width thereof until the axial opening reduces the width of the two side extensions.

7. The multi-purposed spacer grid according to claim 3, wherein two springs, each comprising a curved part and two side extensions, are provided at upper and lower portions inside the middle opening of the frame.

8. The multi-purposed spacer grid according to claim 1, further comprising a mixing blade extending upward to a predetermined length from a side of an upper edge of the upper dimple.

9. The multi-purposed spacer grid according to claim 8, wherein the mixing blade is curved in the same direction as the projecting direction of the spring so as to have a spoon-shaped configuration.

* * * * *